United States Patent [19]

Nozaki et al.

[11] Patent Number: 5,089,285
[45] Date of Patent: * Feb. 18, 1992

[54] JELLY RESEMBLING THE FLESH OF FRUIT

[75] Inventors: Hisashi Nozaki; Seiya Sakurai, both of Saitama, Japan

[73] Assignees: Kabushikikaisha Kibun, Tokyo; Kabushikikaisha Kyowashokuin, Saitama, both of Japan

[*] Notice: The portion of the term of this patent subsequent to Jul. 24, 2007 has been disclaimed.

[21] Appl. No.: 450,487

[22] Filed: Dec. 14, 1989

Related U.S. Application Data

[63] Continuation-in-part of Ser. No. 287,868, Dec. 21, 1988, Pat. No. 4,943,444.

[30] Foreign Application Priority Data

Dec. 22, 1987 [JP] Japan .................. 62-322808

[51] Int. Cl.$^5$ ............................ A23L 1/0528
[52] U.S. Cl. .................. 426/573; 426/524; 426/615
[58] Field of Search .................. 426/573, 524, 615

[56] References Cited

U.S. PATENT DOCUMENTS

| | | | |
|---|---|---|---|
| 4,582,714 | 4/1986 | Ford et al. | 426/564 |
| 4,647,470 | 3/1987 | Sanderson et al. | 426/573 |
| 4,676,976 | 6/1987 | Tobia et al. | 426/654 |
| 4,746,528 | 5/1988 | Prest et al. | 426/573 |

FOREIGN PATENT DOCUMENTS

| | | | |
|---|---|---|---|
| 56-51740 | 12/1981 | Japan . | |
| 0208960 | 12/1982 | Japan | 426/573 |
| 1067457 | 4/1986 | Japan | 426/573 |
| 2190058 | 8/1987 | Japan | 426/573 |

*Primary Examiner*—Donald E. Czaja
*Assistant Examiner*—Helen Pratt
*Attorney, Agent, or Firm*—Browdy and Neimark

[57] ABSTRACT

A jelly having flavor and palatability that resemble those of the flesh of fruit, and a process for producing such jelly are disclosed. The jelly has a konjak flour or konjak mannan and fruit juice as main ingredients, and is produced by the steps of adding the juice of fruit to konjak jelly produced by heating and cooling an alkaline konjak paste or to konjak paste at a pH of 9.0–10.3, stirring the ingredients to form a mixture, freezing the mixture, and finally thawing the frozen mixture. This jelly has great economic utility, good keeping quality and is anticipated to fully satisfy the various taste preferences of the people of today who have wide variety of likes and dislikes.

16 Claims, No Drawings

JELLY RESEMBLING THE FLESH OF FRUIT

This is a continuation-in-part of patent, co-pending application Ser. No. 07/287,868, filed Dec. 21, 1988, the contents of which are incorporated by reference, now U.S. Pat. No. 4,943,444.

TECHNICAL FIELD

The present invention relates to a fruit jelly, better called a firm fruit gel, which resembles the flesh of fruit in flavor and palatibility, as well as a process for producing this product.

BACKGROUND ART

Jelly or gelatin dessert (e.g. "Jello") is a food preparation made by solidifying the juice of fruit or the like with agar, gelatin, carrageenan, etc. and is served cold in order to fully exhibit its mouth-feel including smoothness to the tongue, and its homogeneous consistency. Jelly or gelatin dessert has therefore been a popular dessert for many people.

However, all of the jellies and gelatin desserts so far made available have been rather monotonous in taste and are not completely satisfactory for the people of today who have a very wide variety of likes and dislikes in their food preferences. One of the approaches that has been taken to fill this gap is to add fragments of the flesh of various fruits to a jelly so that a more versatile product range can be provided in terms of flavor. Although such jelly products are marketed in large quantities, the jelly itself is in no way different from the traditional type.

According to Japanese Patent publication No. 56-51740 in the name of Shimizu, the quality of Nikawa-form (not completely gelled/jelly-like) food products containing sugar, including fine sweet paste, marmalade, nougat, jam and the like, can be improved by adding 0.1-05% by weight of konjak flour or konjak mannan to such food product. According to this patent, konjak flour or konjak mannan is added to cold water or warm water at a concentration of 0.1-5.0% by weight, the mixture is stirred for 5-60 minutes until it becomes pasty and is then left to stand for 1-2 hours after stirring so as to obtain an aqueous solution. The solution is then added to the food product at an appropriate stage of its production: for example in the case of fine sweet paste and jelly, the solution is preferably added at the initial stage of the production process in conjunction with agar as a coagulating agent; in the case of marmalade and jam, however, it is desirable to add konjak solution or konjak flour and to sufficiently mix the ingredients during the boiling down process or at the finishing stage of the production process.

The use of konjak gum as a component of sweetened food products such as fruit jelly or the like has been mentioned elsewhere in the prior art, such as in the Sanderson et al U.S. Pat. No. 4,647,470 and the Prest et al U.S. Pat. No. 4,746,528, as well as Toba et al U.S. Pat. No. 4,676,976. In general, however, the flavor and palatability of these products has not been fully satisfactory. For example, the traditional konjak flour used has tended to impart to the food product a characteristic undesirable alkaline flavor and odor. In addition, the use of konjak mannan in the prior art has merely been as a thickener or jelling agent.

SUMMARY OF THE INVENTION

An object of the invention, therefore, is to overcome deficiencies in the prior art, such as indicated above.

Another object of the present invention is to provide a gelled product that resembles the flesh of fruit and which is so unique as to drastically change the image of "jelly" or gelatin dessert in the conventional sense of the term.

The present inventors have engaged in the study of jelly bases that have not previously been used in gelled products of the type contemplated by the present invention, and during their trial-and-error based research they thought of using the konjak thickened gel which they had developed previously. As a result of further studies made in this respect, the present inventors found that when this konjak thickened gel was treated under specified conditions, a firm fruit gel containing the juice of fruit could be obtained which unexpectedly presented palatability (including mouth-feel and texture) and flavor that were just like those of the fruit whose juice was contained in the firm fruit gel. The present invention has been accomplished on the basis of this finding.

In one aspect, the present invention provides a firm fruit gel that resembles the flavor and palatability of the flesh of fruit and which contains a konjak flour or konjak mannan and the juice of a selected fruit or fruits as main ingredients. Surprisingly, the resultant firm fruit gel has not only improved flavor, palatability and mouth-feel without the unpleasant alkaline odor and flavor so often associated with products made using konjak mannan, but the resultant firm fruit gel is characterized by a flavor and palatability which resembles those of the flesh of the fruit itself. Thus, the firm fruit gel of the present invention has more or less a fibrous tissue texture that resembles the texture of a peach or pear, and especially has a texture not unlike that of canned peaches.

In another aspect, the present invention provides a process for producing a firm fruit gel that resembles the flesh of fruit which comprises the steps of: adding the juice of a fruit to a konjak paste of konjak flour and water at a pH of 9.0-10.3 or a konjak jelly obtained by heating and cooling an alkaline konjak paste; stirring the ingredients to form a mixture; freezing the mixture; and finally thawing the frozen mixture.

The present invention is described hereinafter in detail.

DETAILED DESCRIPTION

In order to produce the firm fruit gel of the present invention which resembles the flesh of fruit, it is desirable that an alkaline konjak paste be prepared from a konjak flour, followed by production of konjak thickened gel. Details of the process for producing such a konjak thickened gel are given in the specification of commonly assigned International Publication No. WO88/03760 (corresponding to U.S. application Ser. No. 07/229,174) which is incorporated herein by reference, this process involving the heating and cooling of the alkaline konjak paste.

The heat treatment, which involves the combination of heating temperature of 60-90 with a heating time of 5-210 minutes under alkaline pH conditions, is completed before the konjak paste sets. If the heating conditions exceed the upper limit of the optimal range, the konjak paste sets to a firm gel and undesirably losses its mixibility with other ingredients contrary to what is required according to the present invention. Once the konjak paste has been appropriately heated as described above, it must be cooled quickly to stop the reaction. If this cooling operation is omitted, the paste undesirably becomes a complete or firm gel.

Stated more specifically, any one of the following methods may be adopted to produce a satisfactory konjak thickened gel:

(1) a konjak flour is swollen by addition of Water, and an alkali agent is added and mixed with the swollen konjak flour to render it alkaline, the flour thereafter being heated and cooled to obtain a konjak thickened gel;

(2) a konjak flour is swollen by addition of water containing a alkali agent, and an alkali agent is added and mixed with the swollen konjak flour to render it alkaline, and thereafter the flour is heated and cooled to obtain a konjak thickened gel; or (3) an alkali agent is added and mixed with a konjak flour, which is swollen by addition of water and thereafter heated and cooled under an alkaline condition to obtain a konjak thickened gel.

The konjak flour used in each of the methods described above is the flour of konjak or dried konjak.

The alkali agent to be used is a basic amino acid, a basic salt or a mixture thereof.

Specific examples of the basic amino acid include arginine, histidine, lysine, citruline and ornithine. A particularly preferred basic amino acid is arginine or lysine. These basic amino acids may be used either on their own or as admixtures. The basic amino acid is preferably used in an amount of 1.25-15wt% of the konjak flour.

Any basic edible salts may be used as basic salts but basic phosphate salts and organic acid salts are preferred. For example, sodium carbonate, sodium bicarbonate, calcium carbonate, disodium phosphate, trisodium phosphate, dipotassium phosphate, tripotassium phosphate, sodium polyphosphate, sodium citrate, sodium lactate, etc. are preferably used. The basic salts are preferably used in an amount of 0.01-5 wt% of the konjak flour.

In order to provide a buffer effect, acids such as citric acid and lactic acid or acidic salts such as sodium dihydrogenphophate and potassium dihydrogenphosphate may be appropriately combined such as to produce a final pH in a weakly alkaline range.

The heating temperature and time should be adjusted in accordance with the concentration of salts used, the pH and the physical properties of the konjak thickened gel. If the pH of konjak paste is fairly high, the heating time is shortened, and vice versa. The konjak thickened gel has to be heated under alkaline conditions, and heating is desirably performed with the pH adjusted in such a way that the pH of the konjakhickened gel obtained after cooling will lie within the range of 8.0-10.5, preferably 8.2-10.0.

Preferred combination of pH, temperature and time must be selected in such a way that the pH of the konjak thicknened gel obtained after cooling will lie within the preferred range set forth above. To this end, optimum conditions for combination of these factors are desirably determined by preliminary experiments. Preferred results will be obtained if the heating and cooling operations described above are performed after the konjak paste is placed and sealed in a bag or container made of synthetic resins or some other suitable materials.

To the konjak thickened gel thus obtained, fruit juice or a substance containing it is added, the ingredients are mixed with stirring, and the resulting mixture is charged into a predetermined container. The mixture will normally gel in the container but it is possible to use fruit juice or a substance containing it which will not cause such gelation of the mixture.

In place of the konjak thickened produced according to Ser. No. 07/229,174 now U.S. Pat. No. 4,943,444, one can instead use a konjak paste having a pH of 9.0-10.3 and consisting essentially of konjak flour, konjak mannan or a mixture thereof, water, and a basic amino acid, a basic salt, or a mixture thereof. As in the case when the aforementioned konjak thickened gel is used, the fruit juice or a substance containing fruit juice is added to such konjak paste and the ingredients are mixed with stirring, and the resultant mixture is charged into a container.

The fruit juice or substance containing it for use in the present invention may be selected from among any known materials including natural fruit juice, concentrated fruit juice, fruit-juice containing beverages, fruit-juice containing refreshing drinks and nectar. Examples of juices which are preferably used in the present invention are those of soft-fleshed juice fruits including peach, melon, kiwi fruit, apricot, apple, strawberry, mango, pineapple, pear and mandarine orange. These fruit juices and substances containing them may be used either on their own or as admixtures. If two or more kinds of fruit juice or fruit-juice containing substances are to be used in combination, they may be added successively to the konjak thickened gel or konjak paste. Alternatively, they may be mixed together before being added to the konjak thickened gel or konjak paste. Various other substances such as fruit puree, fruit pulp and the flesh of fruit in fragments may also be added to the konjak thickened gel or konjak paste. The proportions in which fruit juice, substances containing it and other additives are mixed with the konjak thickened gel or konjak paste will vary with the desired physical properties and the concentration of the thickened gel or paste used, but they are usually in the range of 0.5-5 parts by weight, preferably 2-4 parts by weight, per part of weight of the konjak thickened gel or konjak paste. If desired, common edible gelling agents such as agar, gelatin and pectin may be added to control the palatability and other properties of the resultant fruit jelly which resembles the flesh of fruit.

Various other additives including sweeteners, seasonings, flavors, sour taste imparting agents, dyes, vitamins, etc. may also be added in accordance with a specific object desired to be attained.

Stirring is one of the important steps for producing the firm fruit gel of the present invention which resembles the flesh of fruit as pointed out above. Upon stirring, the mixture of konjak thickened gel or konjak paste and fruit juice forms a weak gel, whose properties will change with the intensity of stirring. Therefore, the properties including texture, and consequently the palatability of the final product can be controlled by proper adjustment of the stirring. Stirring can be done With any of the ordinary stirrers used in association with food articles, and stirrers for home use may be employed. With this type of stirrer (200 rps), stirring is generally performed at 10°-25° C. for 20-100 seconds, preferably for 30-60 seconds.

There is no particular limitation on the type of container in which the mixture of konjak thickened gel or konjak paste and fruit juice is placed, and a suitable container may be selected in accordance with the shape of the jelly to be finally obtained.

After being gelled in the container by the steps described above, the mixture of konjak thickened gel or konjak paste and fruit juice must be frozen. Freezing is performed at a temperature of −30° C. to −5° C. for a period of 6-30 hours. This can be done usually by placing the gelled mixture in a common freezer (ca. −20° C.) for about 24 hours. The physical properties of the resultant fruit jelly can be subtly changed by adjusting the speed of freezing.

By thawing the frozen gel, a desired thermally-irreversible firm fruit gel is obtained that has flavor and palatability which are just like those of the flesh of the fruit whose juice is contained in the firm gel. It will be understood that the thermally-irreversible firm fruit gel of the present invention is provided with such a mouth-feel of the flesh of the fruit by virtue of its texture which is like the fibrous tissues of the fruit itself. There is no particular limitation on the method of thawing the frozen gel but it is generally thawed at 15°-40° C., preferably at room temperature.

EXAMPLES

The following examples are provided for the purpose of further illustrating the present invention but are in no way to be taken as limiting.

EXAMPLE 1

To 140 g of a konjak flour, 5 liters of water having 25 g of sodium carbonate and 25 g of sodium dihydrogenphosphate dissolved therein was added to fully swell the konjak flour. The swollen konjak flour was charged into a synthetic resin bag, sealed, heated at 70° C. for 30 minutes and cooled to obtain a konjak thickened gel.

To 300 g of this konjak thickened gel, 600 ml of melon juice was added and the ingredients were mixed for one minute by stirring with a mixer at 200 rps. The mixture was packed into a synthetic resin container and allowed to gel. The gel was frozen for 2 hours in a freezer. (ca. −20° C.) and thereafter thawed at room temperature. A firm fruit gel having the flavor and palatability of melon was obtained.

EXAMPLE 2

A konjak thickened gel was prepared as in Example 1 and to 200 g of this jelly, 600 ml of the juice of mashed peach was added and the ingredients were mixed for one minute by stirring with a mixer at 200 rps. The mixture was packed into a synthetic resin container and allowed to gel. The gel was frozen for 24 hours in a freezer (ca. −20° C.) and thereafter thawed at room temperature. A firm fruit gel having the flavor and palatability, including the mouth-feel and texture, of peach was obtained.

EXAMPLE 3

A konjak thickened gel was prepared as in Example 1 and to 200 g of this jelly, a mixture of grape juice (600 ml) and gelatin (4.5 g) dissolved in a small amount of hot water as added, and the ingredients were mixed for one minute by stirring with a mixer at 200 rps. The mixture was packed into a synthetic resin container and allowed to gel. The gel was frozen for 24 hours in a freezer (ca. −20° C.) and thereafter thawed at room temperature. A firm fruit gel having the flavor and palatability of grapes was obtained.

EXAMPLE 4

A konjak thickened gel was prepared as in Example 1 and to 200 g of this jelly, a mixture of kiwi fruit juice (600 ml) and pectin (4 g) dissolved in a small amount of hot water was added, and the ingredients were mixed for one minute by stirring with a mixer at 200 rps. The mixture was packed into a synthetic resin container and allowed to gel. The gel was frozen for 24 hours in a freezer (ca. −20° C.) and thereafter thawed at room temperature. A firm fruit gel having the flavor and palatability of kiwi fruit was obtained.

EXAMPLE 5

To 140 g of a konjak flour, 5 liters of water having 15 g of sodium carbonate and 15 g of sodium hydrogenphosphate dissolved therein was added to fully swell the konjak flour. The swollen konjak flour was charged into a synthetic resin bag, sealed, heated at 80° C. for 25 hours and cooled to obtain a konjak thickened gel.

To 200 g of this konjak thickened gel, 600 g of the juice of mashed peach consisting of 1 part by weight of the flesh of peach and 1 part by weight of syrup (Brix 18) was added and the ingredients were mixed for one minute by stirring with a mixer at 200 rps. This mixture was packed into a synthetic resin container. The mixture of konjak thickened gel and peach juice in the container was in the state of a sol rather than a gel. The sol was frozen for 24 hours in a freezer (ca. −20° C.) and thereafter thawed at room temperature. The thawed product was a firm fruit gel having the flavor and palatability including texture of peach.

EXAMPLE 6

One thousand milliliters of water was added to 28 g of a konjak flour under stirring so that the konjak flour swelled in water. The mixture was then allowed to stand for 2 hours at room temperature, thereby satisfactorily effecting swelling of the konjak flour. A solution of 4 g of sodium carbonate in 10 ml of water, that is a coagulating agent, was added to and intimately mixed with the resulting mixture. The pH of the konjak paste thus obtained was 10.15.

To 200 g of the konjak paste was added 600 g of mashed puree of peach and the ingredients were mixed for one minute by stirring with a mixer at 200 rps. The mixture was packed into a synthetic resin container and frozen for 24 hours in a freezer and thereafter thawed at room temperature. A firm fruit gel having the flavor and palatability, including the mouth-feel and texture of peach was obtained.

EXAMPLE 7

One thousand milliliters of water was added to 30 g of a konjak flour under stirring so that the konjak flour swelled in water. The mixture was then allowed to stand for 2 hours at room temperature, thereby satisfactorily effecting swelling of the konjak flour. A solution of 1.5 g of sodium carbonate in 10 ml of water, that is a coagulating agent, was added to and intimately mixed with the resulting mixture. The pH of the konjak paste thus obtained was 9.43.

To 200 g of the konjak paste was added a mixture of grape juice (600 ml) and pectin (2 g) dissolved in hot water (20 ml) and the ingredients were mixed for one minute by stirring with a mixer at 200 rpm. The mixture was packed into a synthetic resin container and frozen for 24 hours and thereafter thawed at room temperature. A firm fruit gel having the flavor and palatability of grapes was obtained.

EXAMPLE 8

One thousand milliliters of water was added to 28 g of a konjak flour under stirring so that the konjak flour swelled in water. The mixture was then allowed to stand for 2 hours at room temperature, thereby satisfactorily effecting swelling of the konjak flour. A solution of 2.5 g of sodium carbonate in 10 ml of water, that is a coagulating agent, was added to and intimately mixed with the resulting mixture. The pH of the konjak paste thus obtained was 9.85.

To 200 g of the konjak paste was added 600 g of mashed puree of apricot and the ingredients were mixed for one minute by stirring with a mixer at 200 rps. The mixture was packed into a synthetic resin container and frozen for 24 hours in a freezer and thereafter thawed at room temperature. A firm fruit gel having the flavor and palatability of apricot was obtained.

COMPARATIVE EXAMPLE 1

One thousand milliliters of water was added to 28 g of a konjak flour under stirring so that the konjak flour swelled in water. The mixture was then allowed to stand for 2 hours at room temperature thereby satisfactorily effecting swelling of the konjak flour. The pH of the paste thus obtained was 6.3.

To the paste was added 600 ml of juice of grapes and the ingredients were mixed for one minute by stirring with a mixer at 200 rps. The mixture was packed into a synthetic resin container and frozen for 24 hours and thereafter thawed at room temperature. An ungelled paste was obtained.

COMPARATIVE EXAMPLE 2

One thousand milliliters of water was added to 28 g of a konjak flour under stirring so that the konjak flour swelled in water. The mixture was then allowed to stand for 2 hours at room temperature, thereby satisfactorily effecting swelling of the konjak flour. A solution of 2 g of sodium bicarbonate in 10 ml of water, that is a coagulating agent, was added to and intimately mixed with the resulting mixture. The pH of the paste thus obtained was 7.98.

To 200 g of the konjak paste was added 600 g of mashed puree of apricot and the ingredients were mixed for one minute by stirring with a mixer at 200 rps. The mixture was packed into a synthetic resin container and frozen for 24 hours in a freezer and thereafter thawed at room temperature. An ungelled paste was obtained.

COMPARATIVE EXAMPLE 3

One thousand milliliters of water was added to 30 g of a konjak flour under stirring so that the konjak flour swelled in water. The mixture was then allowed to stand for 2 hours at room temperature, thereby satisfactorily effecting swelling of the konjak flour. A solution of 1.3 g of calcium hydroxide in 10 ml of water, that is a coagulating agent, was added to and intimately mixed with the resulting mixture. The pH of the paste thus obtained was 11.0.

To 200 of the konjak paste was added 600 g of mashed puree of peach and the ingredients were mixed for one minute by stirring with a mixer at 200 rps. The mixture was packed into a synthetic resin container and frozen for 24 hours in a freezer and thereafter thawed at room temperature. A product having a strong alkaline smell and taste was obtained. This product has a sponge-like structure and easily releases water contained therein.

ADVANTAGES OF THE INVENTION

The fruit jelly of the present invention which resembles the flesh of fruit in taste, odor and texture is an entirely novel food article in jelly form that uses as a base of the konjak flour or konjak mannan, which has not previously been used in jelly products of the type contemplated by the present invention. If peach juice is incorporated, the palatability and flavor of the jelly will be just like those of canned peaches. In other words, the present invention provides a jelly that resembles the palatability and flavor of the fruit whose juice is incorporated therein.

Having such unique palatability and flavor, the firm fruit gel of the present invention which resembles the flesh of fruit is anticipated to fully satisfy the various taste preferences of the people of today who have a wide variety of likes and dislikes. At the same time, the present invention will offer great benefits to industry, having successfully developed a method of utilizing fruits in a way that is improved not only in economic terms but also in terms of their keeping quality.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A thermally-irreversible firm fruit gel having fibrous tissues that resemble those of the peach, which contains fruit juice and a substantially unheated gelling agent consisting essentially of a konjak flour, konjak mannan, or a mixture thereof with an alkaline agent.

2. A firm fruit gel according to claim 1 wherein the fruit juice originates from at least one fruit selected from the group consisting of peach, grape, melon, kiwi fruit, apricot, apple, strawberry, mango, pineapple, pear and mandarine orange.

3. A firm fruit gel according to claim 1 which additionally contains at least one ingredient selected from the group consisting of the flesh of fruit in fragments, edible gelling agents, sweeteners, seasonings, flavors, sour taste imparting agents, dyes, vitamins, fruit puree and fruit pulp.

4. A firm fruit gel having fibrous tissues that resembles those of a peach, which is produced by the steps of:
   (a) adding a fruit juice component to a component consisting essentially of konjak flour alkaline agent and water and stirring these components to form a mixture,
   (b) freezing the mixture; and
   (c) thawing the frozen mixture.

5. A firm fruit gel according to claim 4 wherein the fruit juice originates from at least one fruit selected from the group consisting of peach, grape, melon, kiwi fruit, apricot, apple, strawberry, mango, pineapple, pear and mandarine orange.

6. A firm fruit gel according to claim 4 which additionally contains at least one ingredient selected from the group consisting of the flesh of fruit in fragments, edible gelling agents, sweeteners, seasonings, flavors, sour taste imparting agents, dyes, vitamins, fruit puree and fruit pulp.

7. A frozen firm fruit gel which when thawed has fibrous tissues that resemble those of a peach, which is produced by the steps of:
   (a) adding a fruit juice component to a component consisting essentially of konjak flour, alkaline agent and water and stirring these components to form a mixture; and
   (b) freezing the mixture.

8. A firm fruit gel according to claim 7 wherein the fruit juice originates from at least one fruit selected from the group consisting of peach, grape, melon, kiwi fruit, apricot, apple, strawberry, mango, pineapple, pear and mandarine orange.

9. A firm fruit gel according to claim 7 which additionally contains at least one ingredient selected from the group consisting of the flesh of fruit in fragments, edible gelling agents, sweeteners, seasonings, flavors, sour taste imparting agents, dyes, vitamins, fruit puree and fruit pulp.

10. A firm fruit gel having fibrous tissues that resembles those of a peach, which is produced by the steps of:
    (a) adding a fruit juice component to a konjak component comprising a konjak mannan, alkaline agent and water to form a mixture;
    (b) freezing the mixture; and
    (c) thawing the frozen mixture.

11. A firm fruit gel according to claim 10 wherein the konjak component is a substantially unheated konjak paste which has a pH of 9.0–10.3 and consists essentially of konjak flour, konjak mannan or a mixture thereof, water, and wherein said alkaline agent is a basic amino acid, a basic salt, or a mixture thereof.

12. A frozen firm fruit gel having fibrous tissues that resemble those of a peach when thawed, which is produced by the steps of:
    (a) adding a fruit juice component to a konjak component comprising a konjak mannan, alkaline agent and water to form a mixture;
    (b) freezing the mixture; and
    (c) thawing the frozen mixture.

13. A thermally-irreversible firm fruit gel according to claim 1, which comprises a frozen and thawed weak gel formed of a mixture of fruit juice and konjak paste which has a pH of 9.0-10.3 and consists essentially of said konjak flour, konjak mannan or a mixture thereof, water, and wherein said alkaline agent is a basic amino acid, a basic salt, or a mixture thereof.

14. A thermally irreversible firm fruit gel according to claim 1 wherein said gelling agent, prior to mixture with said fruit juice, has a pH greater than 8.0.

15. A firm fruit gel according to claim 4 wherein said component consisting essentially of konjak flour and water has a pH greater than 8.0 prior to said stirring to form a mixture.

16. A firm fruit gel according to claim 10 wherein said konjak component, prior to formation of said mixture, has a pH greater than 8.0.

* * * * *

UNITED STATES PATENT AND TRADEMARK OFFICE
CERTIFICATE OF CORRECTION

PATENT NO. : 5,089,285
DATED : February 18, 1992
INVENTOR(S) : NOZAKI et al.

It is certified that error appears in the above-identified patent and that said Letters Patent is hereby corrected as shown below:

On the title page:

[73] Assignees:    Delete "Kabushikikaisha Kibun, Tokyo; Kabushikikaisha Kyowashokuin", insert therefor -- Kabushikikaisha Kibun, Tokyo; Kabushikikaisha Kyowashokuhin --

Signed and Sealed this

Twelfth Day of October, 1993

Attest:

BRUCE LEHMAN

Attesting Officer    Commissioner of Patents and Trademarks